United States Patent
Lim et al.

(10) Patent No.: US 12,411,005 B2
(45) Date of Patent: Sep. 9, 2025

(54) OPTICAL ENCODING SYSTEM WITH REDUCED TOTAL HARMONIC DISTORTION

(71) Applicant: PIXART IMAGING INC., Hsin-Chu County (TW)

(72) Inventors: Meng-Yee Lim, Penang (MY); Priscilla Tze-Wei Goh, Penang (MY); Kuan-Choong Shim, Penang (MY); Gim-Eng Chew, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 260 days.

(21) Appl. No.: 17/970,566

(22) Filed: Oct. 21, 2022

(65) Prior Publication Data

US 2024/0133680 A1 Apr. 25, 2024
US 2024/0230321 A9 Jul. 11, 2024

(51) Int. Cl.
*G01B 11/26* (2006.01)
*G01D 5/26* (2006.01)

(52) U.S. Cl.
CPC .............. *G01B 11/26* (2013.01); *G01D 5/264* (2013.01)

(58) Field of Classification Search
CPC ........ G01B 11/26; G01B 11/00; G01D 5/264; G01D 5/24438; G01D 5/34792; G01D 5/34707; G01D 5/34715; G01D 5/3473; G01D 5/249; G01D 5/34; G01D 5/34746
See application file for complete search history.

(56) References Cited

U.S. PATENT DOCUMENTS

| | | | |
|---|---|---|---|
| 7,095,011 B2 * | 8/2006 | Kojima | G01D 5/34715 250/231.13 |
| 7,312,436 B2 * | 12/2007 | Tovar | G01D 5/34707 250/231.13 |
| 11,237,024 B2 | 2/2022 | Shim et al. | |

* cited by examiner

*Primary Examiner* — Tony Ko
(74) *Attorney, Agent, or Firm* — HAUPTMAN HAM, LLP

(57) ABSTRACT

There is provided an optical encoding system including a photodiode array and a code disk opposite to each other. The code disk is arranged with multiple code slits at a ring area corresponding to the photodiode array. A length direction of each photodiode of the photodiode array has at least one deviation angle with respect to a length direction of the multiple code slits to reduce the total harmonic distortion in photocurrents.

19 Claims, 5 Drawing Sheets

OPTICAL ENCODING SYSTEM WITH REDUCED TOTAL HARMONIC DISTORTION

BACKGROUND

1. Field of the Disclosure

This disclosure generally relates to an optical encoding system and, more particularly, to an optical encoding system and the arrangement of a photodiode array and a code disk thereof capable of alleviating the total harmonic distortion in photocurrents.

2. Description of the Related Art

The optical rotation encoder can be adapted to detect an absolute position or a relative position of unlimited rotating shaft such as application in an optical mouse or a printer.

The optical rotation encoder includes a code disk and a photodiode array. The photodiode array receives modulated light from the code disk to output differential quadrature signals having 90-degree phase shift from one another. However, said differential quadrature signals have total harmonic distortion and said phase shift may not be exactly identical to 90 degrees, and these issues can degrade positioning accuracy in post-processing. In addition, in the case employing differential index to confirm the absolute position, error index signal can be generated due to the optical magnification mismatch.

Accordingly, an optical encoding system that can alleviate or even eliminate the total harmonic distortion in photocurrents is necessary.

SUMMARY

The present disclosure provides an optical encoding system including a code disk. Multiple code slits on the code disk are arranged to have a slant angle with respect to a radial direction of the code disk so as to reduce total harmonic distortion thereby improving the positioning accuracy.

The present disclosure further provides an optical encoding system including a photodiode array. Multiple photodiodes of the photodiode array are arranged to have a slant angle with respect to a radial direction of the code disk so as to reduce total harmonic distortion thereby improving the positioning accuracy.

The present disclosure provides an optical encoding system including a code disk. The code disk is arranged with equally-spaced multiple code slits along a tangential direction, and a length direction of the multiple code slits has a slant angle with respect to a radial direction of the code disk.

The present disclosure further provides an optical encoding system including a code disk. The code disk is arranged with equally-spaced multiple code slits along a tangential direction, and the multiple code slits have a first length direction and a second length direction, wherein the first length direction has a first slant angle with respect to a radial direction of the code disk, and the second length direction has a second slant angle with respect to the radial direction of the code disk.

The present disclosure further provides an optical encoding system including a photodiode array. The photodiode array includes multiple sets of photodiodes each se having a first photodiode, a second photodiode, a third photodiode and a fourth photodiode arranged along a first direction, wherein a first part and a second part of the first photodiode, the second photodiode, the third photodiode and the fourth photodiode are slanted toward the first direction.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure provides an optical encoding system that alleviates total harmonic distortion in photocurrents by arranging slanted slits and/or slanted photodiode array. The present disclosure is applicable to both the transmission-type optical encoding system and the reflection-type optical encoding system.

Figure 1:
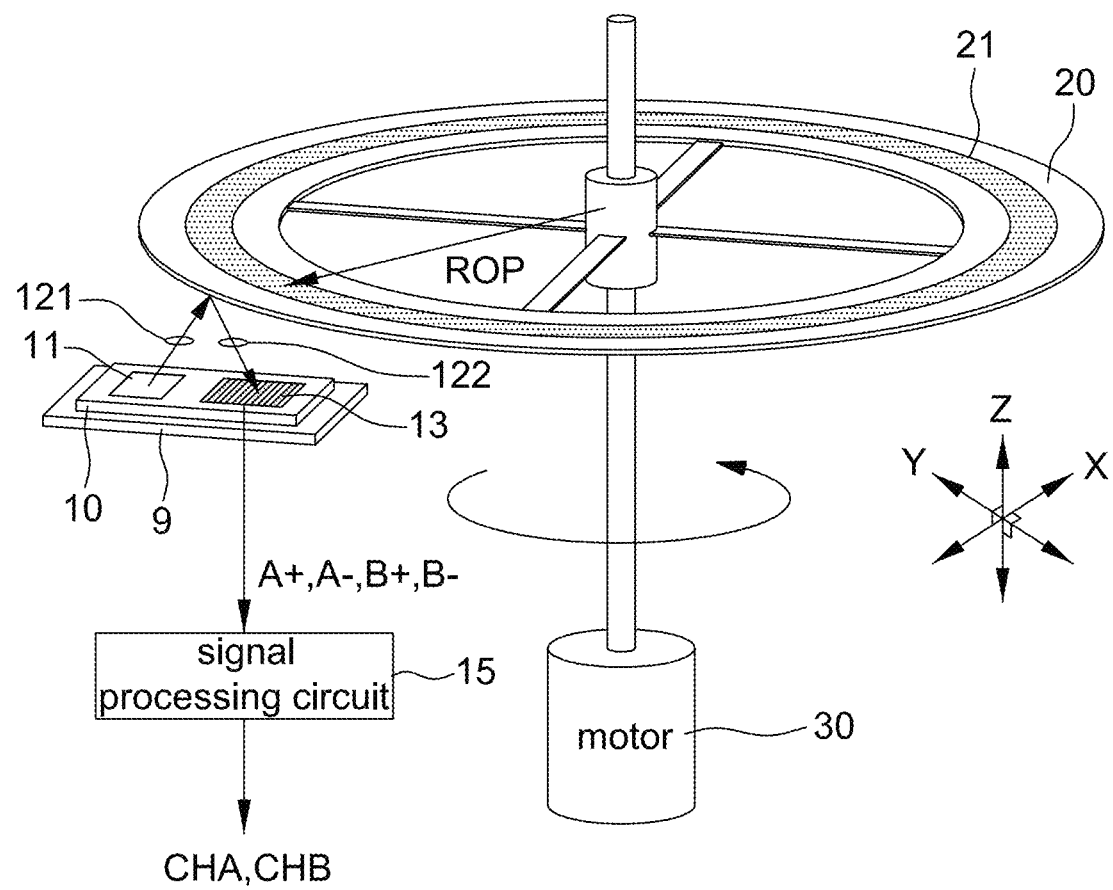
FIG. 1 is a schematic diagram of an optical encoding system according to one embodiment of the present disclosure.

Referring to FIG. 1, it is a schematic diagram of an optical encoding system 100 according to one embodiment of the present disclosure. The optical encoding system 100 includes a sensing chip 10 arranged on a substrate 9 and a code disk 20 corresponding to the sensing chip 10, wherein a plurality of code slits 21, e.g., including position slits (e.g., or called AB slits), are arranged on the code disk 20 in equal-space. In some aspects, the code slits 21 further include index slits.

The index slits are generally used to indicate an initial angle, a final angle or a specific angle. The purpose of arranging index slits may be referred to U.S. patent application Ser. No. 16/583,972, entitled "OPTICAL ENCODER WITH COVERED PHOTO DIODE" filed on Sep. 26, 2019, assigned to the same assignee of the present application, and the full disclosure of which is incorporated herein by reference. The present disclosure is illustrated by code slits 21 including only position slits.

FIG. 1 shows that the code disk 20 is controlled by a motor 30 to rotate clockwise or counter clockwise, but the present disclosure is not limited thereto. According to different applications, the code disk 20 is implemented as a code stripe that has linear movement with respect to the sensing chip 10.

In FIG. 1, a tangential direction of the code disk 20 is shown as an X-direction, a radial direction of the code disk 20 is shown as a Y-direction, and a Z-direction is a longitudinal direction of the system.

The sensing chip 10 includes a light source 11 and a photodiode array 13. The light source 11 is, for example, a light emitting diode or a laser diode, and is used to emit light of an identifiable spectrum (e.g., infrared light, but not limited to) to illuminate the code slits 21 on the code disk 20 via a lens 121. In the reflection-type optical encoding system, the code slits 21 modulate incident light to generate reflected light propagating to the photodiode array 13 via another lens 122. In the transmission-type optical encoding system, the light source 11 and the photodiode array 13 may not be arranged in the same encapsulation, but are respectively arranged at two opposite sides of the code disk 20.

It should be mentioned that although FIG. 1 shows that the lenses 121 and 122 are separated from the sensing chip 10, it is only intended to illustrate but not to limit the present disclosure. In other aspects, the lenses 121 and/or 122 are arranged inside the sensing chip 10 to adjust (e.g., directing and zooming) light paths.

Figure 2:
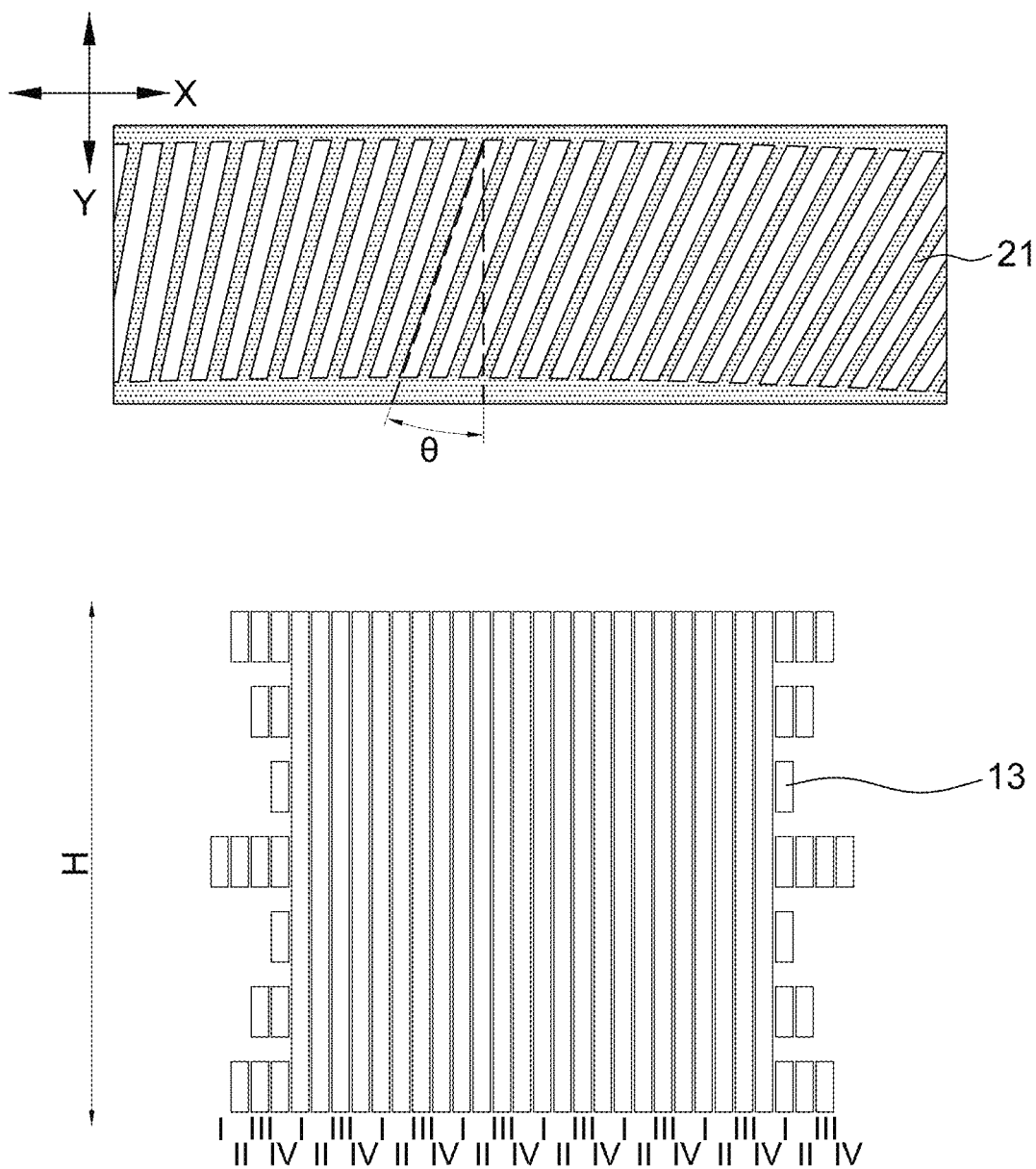
FIG. 2 is a schematic diagram of a photodiode array and code slits of an optical encoding system according to one embodiment of the present disclosure.

Please referring to FIG. 2, it is a schematic diagram of a photodiode array 13 and code slits 21 of an optical encoding system 100 according to one embodiment of the present disclosure. It should be mentioned that FIG. 2 shows some code slits 21 (e.g., parts opposite to the photodiode array 13) formed on the code disk 20 for illustration purposes. In one aspect, there are formed a circle of code slits 21 on the code disk 20 as shown in FIG. 1, e.g., including a plurality of position slits.

The photodiode array 13 includes at least three sets of photodiodes (e.g., FIG. 2 showing 8 sets, but not limited to) adjacently arranged to one another along a first direction. Each set of photodiodes has a first photodiode I, a second photodiode II, a third photodiode III and a fourth photodiode sequentially arranged along the first direction. The at least three sets of photodiodes include a first se of photodiodes (e.g., the most left set) and a last set of photodiodes (e.g., the most right set) respectively arranged at two ends of the at least three sets of photodiodes. In the present disclosure, the first direction is, for example, an arranging direction of the plurality of photodiodes and a tangential direction of the code disk 20.

During operation, when the code slits 21 pass over photodiodes, total harmonic distortion is induced, especially the photodiodes at two ends contributing the most to the total harmonic distortion. Accordingly, the present disclosure further provides an opaque layer, which blocks light spectrum emitted by the light source 11, to cover upon the first set of photodiodes and the last set of photodiodes. As shown in FIG. 2, a coverage of the first photodiode I, the second photodiode II, the third photodiode III and the fourth photodiode IV of the first set of photodiodes (e.g., the most-left set in FIG. 2) by the opaque layer is sequentially decreased (FIG. 2 showing active areas capable of receiving light sequentially increased); whereas, a coverage of the first photodiode I, the second photodiode II, the third photodiode III and the fourth photodiode IV of the last set of photodiodes (e.g., the most-right set in FIG. 2) by the opaque layer is sequentially increased (FIG. 2 showing active areas capable of receiving light sequentially decreased).

In one non-limiting aspect, coverages of the first photodiode I, the second photodiode II, the third photodiode III and the fourth photodiode IV of the first set of photodiodes by the opaque layer is respectively 85%-95%, 65%-75%, 45%-55% and 25%-35%; whereas, coverages of the first photodiode I, the second photodiode II, the third photodiode III and the fourth photodiode IV of the last set of photodiodes by the opaque layer is respectively 25%-35%, 45%-55%, 65%-75% and 85%-95%.

Figure 3:
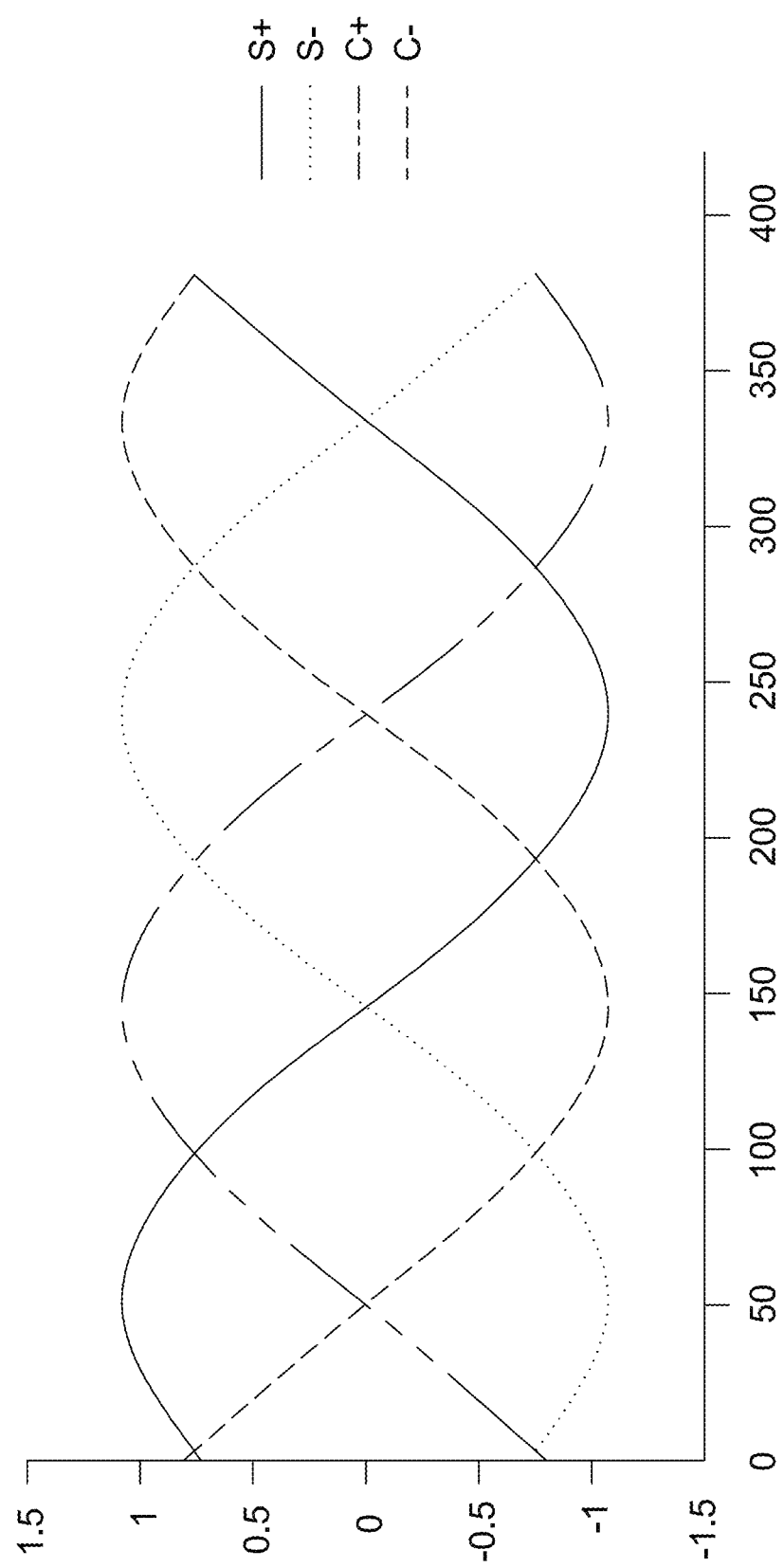
FIG. 3 is a schematic diagram of output currents of photodiodes of an optical encoding system according to one embodiment of the present disclosure.

Referring to FIGS. 1 and 3 together, FIG. 3 is a schematic diagram of output currents of every photodiode of an optical encoding system 100 according to one embodiment of the present disclosure. In this embodiment, output currents of the first photodiode I and the second photodiode II are phase quadrature, e.g., the first photodiode I generating a signal A+ in FIG. 1 which is shown as S+ in FIG. 3; and the second photodiode II generating a signal B+ in FIG. 1 which is shown as C+ in FIG. 3. Output currents of the first photodiode and the third photodiode III are out of phase, e.g., the third photodiode Ill generating a signal A− in FIG. 1 which is shown as S− in FIG. 3. Output currents of the second photodiode II and the fourth photodiode IV are out of phase, e.g., the fourth photodiode IV generating a signal B− in FIG. 1 which is shown as C− in FIG. 3. It should be mentioned that the photocurrents may be ramp signals and are not limited to the sinusoidal signals shown in FIG. 3.

The optical encoding system 100 further includes a signal processing circuit 15 for generating two channel signals CHA and CHB, according to the signals A+, A−, B+ and B−, to be provided to a downstream circuit (e.g., a processor) for identifying a rotation angle of the code disk 20. The method of generating the two channel signals CHA and CHB is known to the art and not a main objective of the present disclosure, and thus details thereof are not described herein.

In this embodiment, the first photodiode I, the second photodiode II, the third photodiode III and the fourth photodiode IV of the at least three sets of photodiodes have a same width along the first direction, and have a same height H along a second direction (e.g., corresponding to Y-direction in FIG. 1) perpendicular to the first direction. More specifically, each of the uncovered photodiodes have an identical sensing area (or referred to active area).

The code disk 20 includes a plurality of code slits 21 corresponding to the photodiode array 13, In one aspect, the code slits 21 form dark regions (e.g., non-reflective regions or non-transmissive regions), and spaces between the code slits 21 form bright regions (e.g., reflective regions or transmissive regions). In another aspect, the code slits 21 form bright regions, but spaces between the code slits 21 form dark regions according to different applications.

In one non-limiting aspect, a slit width and a slit pitch (i.e., a distance between adjacent slits) of the code slits 21 are equal to 2 times of a width of photodiodes.

In another aspect, no matter whether the slit width of the code slits 21 is 2 times of the width of photodiodes or not, an optical image profile of the code slits 21 projected (reflected light or transmissive light depending on a type of the encoder) onto the photodiode array 13 is arranged to be 2 times of the width of photodiodes. In this embodiment, a size of the optical image profile is determined by the magnification of the lenses 121 and 122 as well as relative distances between components. Preferably, the optical image profile projected onto the photodiode array 13 from the code slits 21 matches the photodiode size.

Details of arranging two sets of partially covered photodiodes at two ends of a photodiode array may also be referred to U.S. patent application Ser. No. 16/583,972.

Figure 4:
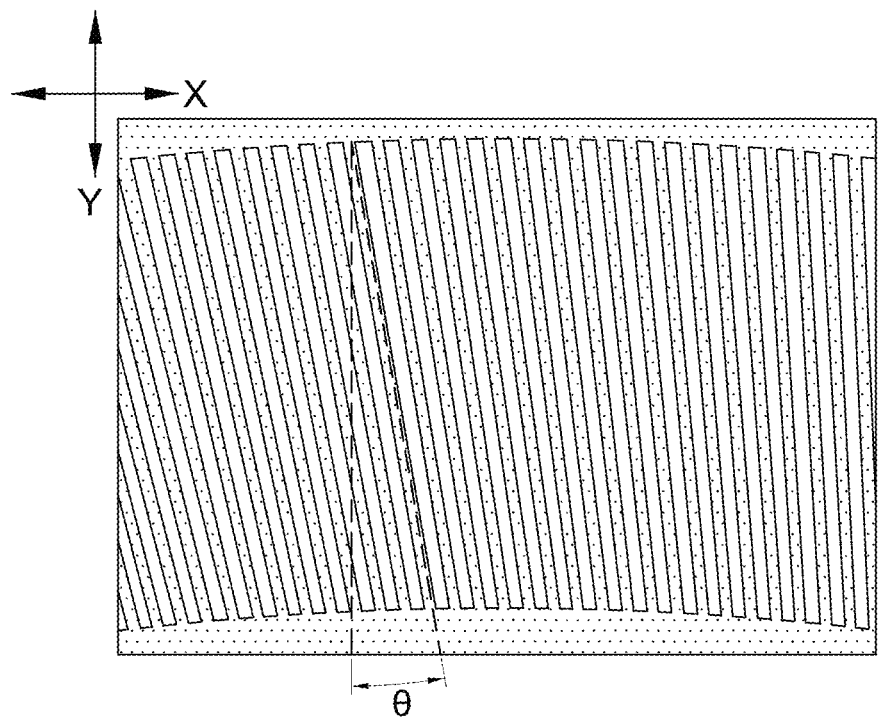
FIG. 4 is a schematic diagram of code slits of an optical encoding system according to another embodiment of the present disclosure.

Please refer to FIG. 2 again, in the present disclosure, the code slits 21 are arranged on the code disk 20 in equal-space along the tangential direction X, and a length direction thereof has a slant angle θ with respect to the radial direction Y to further reduce the total harmonic distortion. The code slits 21 are slanted toward a clockwise direction (e.g., shown in FIG. 2) or a counter clockwise direction (e.g., shown in FIG. 4) of the code disk 20. Meanwhile, a length direction (e.g., up and down directions in FIG. 2) of each photodiode of the photodiode array 13 is arranged along the radial direction Y of the code disk 20.

The slant angle θ is determined according to a height (i.e. length in the radial direction) and a width (i.e. length in the tangential direction) of the photodiode as well as a number of multiple code slits 21 on the code disk 20 (determining pitch of slits). In one aspect, it is assumed that an operating radius (ROP shown in FIG. 1) is 11 mm, a length H of an active area of the photodiode is 0.34 mm, and there are 865 code slits 21 on the code disk 20. Firstly, a pitch of photodiodes is arranged as 4×π×(11000+170/2)/865=161.04 μm. Then, a preferable slant angle θ is equal to arcTan ((161.04/3)/(340/1))×180/π=8.97° e.

Figure 5:
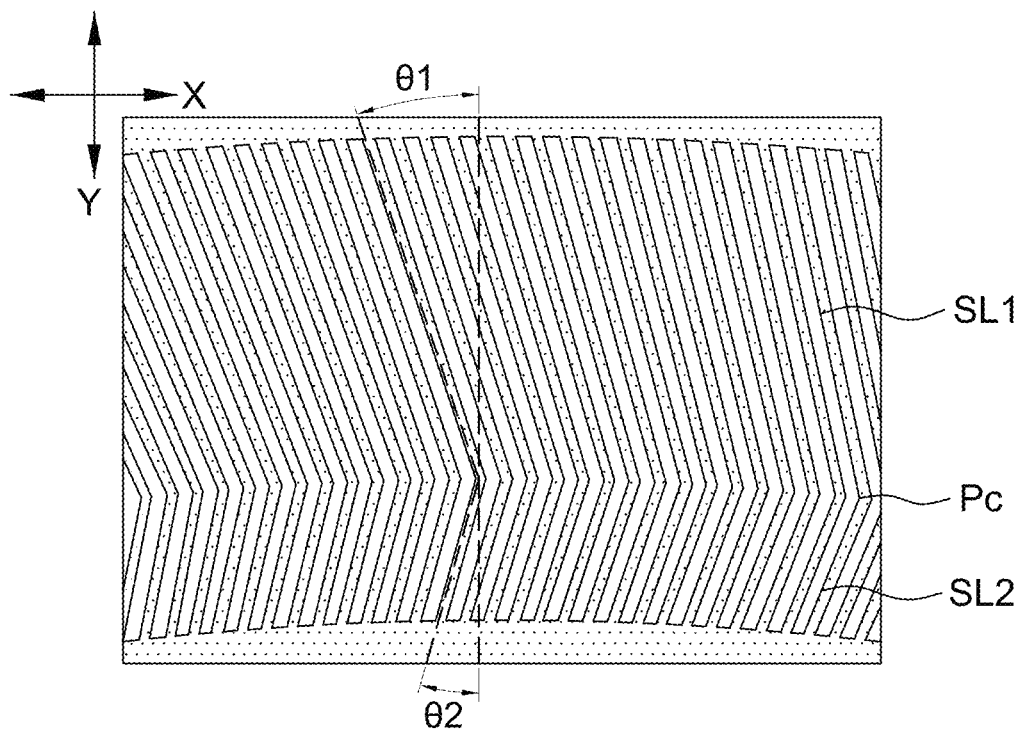
FIG. 5 is a schematic diagram of code slits of an optical encoding system according to an alternative embodiment of the present disclosure.

Please refer to FIG. 5, it is a schematic diagram of code slits 21 of an optical encoding system 100 according to an alternative embodiment of the present disclosure. In this embodiment, the code disk 20 is arranged with multiple code slits 21 in equal-space along the tangential direction. Each of the code slits 21 has a first length direction of a first length SL1 and a second length direction of a second length SL2, wherein the first length direction has a first slant angle θ1 with respect to the radial direction Y of the code disk 20, and the second length direction has a second slant angle θ2 with respect to the radial direction Y of the code disk 20. The first length direction and the second length direction are both tilted toward a clockwise or a counter clockwise direction of the code disk 20.

Meanwhile, a length direction of each photodiode of the photodiode array 13 is arranged along the radial direction Y. Preferably, a center point of the length direction of the photodiode array 13 is aligned with a connection point Pc of the first length SL1 and the second length SL2.

In one aspect, the first length SL1 of the code slits 21 in the first length direction is equal to the second length SL2 of the code slits 21 in the second length direction, and the first slant angle θ1 is equal to the second slant angle θ2. For example, a connection point Pc of the first length SL1 and the second length SL2 is at a center (in the radial direction) of the multiple code slits 21.

In another aspect, the first length SL1 of the code slits 21 in the first length direction is not equal to the second length SL2 of the code slits 21 in the second length direction, and the first slant angle θ1 is not equal to the second slant angle θ2. In this aspect, the connection point Pc is at the center or not at the center point of the multiple code slits 21 without particular limitations.

Similarly, the first slant angle θ1 and the second slant angle θ2 are determined according to a number of the multiple code slits 21 and a size of each photodiode of the photodiode array 13. In an aspect that the connection point Pc is located at the center of the multiple code slits 21 and the above component parameters are used, when the pitch of photodiodes is 161.04 μm, a preferable slant angle θ1=θ2 is equal to arcTan ((161.04/3)/(340/2))×180/π=17.52° e.

The slant angle is within a predetermined range. Preferably, the slant angle is not larger than the pitch of photodiodes.

Figure 6:
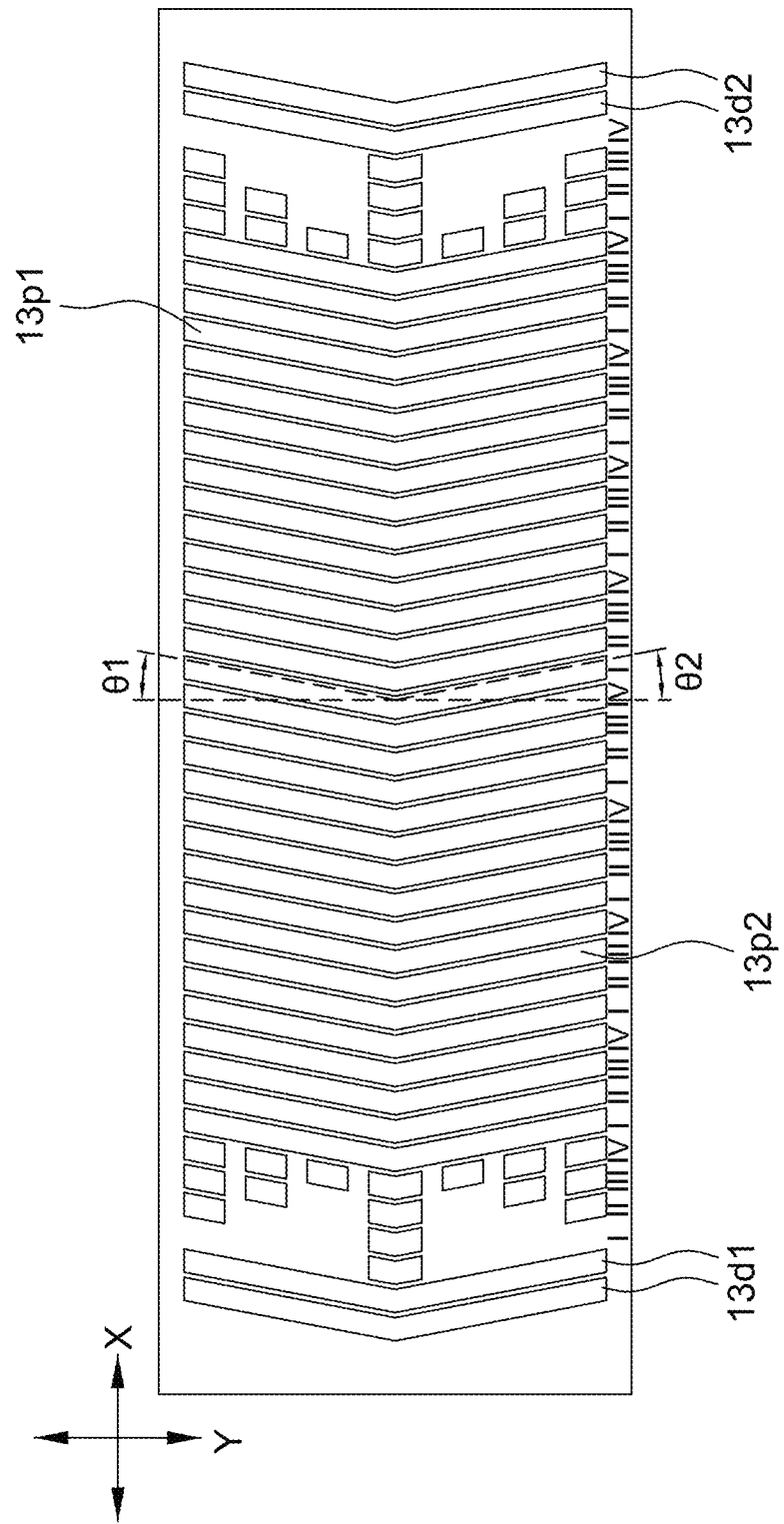
FIG. 6 is a schematic diagram of a photodiode array of an optical encoding system according to a further alternative embodiment of the present disclosure.

Please refer to FIG. 6, it is a schematic diagram of a photodiode array 13 of an optical encoding system 100 according to a further alternative embodiment of the present disclosure. In this embodiment, a first part (e.g., upper part in FIG. 6) 13p1 and a second part (e.g., lower part in FIG. 6) 13p2 of the first photodiode the second photodiode II, the third photodiode III and the fourth photodiode IV in a second direction (e.g., Y-direction) perpendicular to a first direction (e.g., X-direction) are respectively tilted toward the first direction, e.g., shown to be tilted toward right, also possibly being tilted toward left.

In one aspect, a length of the first part 13p1 is equal to a length of the second part 13p2, and a first slant angle θ1 of the first part 13p1 toward the first direction is equal to a second slant angle θ2 of the second part 13p2 toward the first direction. In this embodiment, a length direction of the multiple code slits 21 of the code disk 20 is arranged along the second direction, i. e., Y-direction. For example, a connection point of the first part 13p1 and the second part 13p2 is at a center of the photodiode, but the present disclosure is not limited thereto. In another aspect, a connection point of the first part 13p1 and the second part 13p2 is not at a center of the photodiode, and the first slant angle θ1 of the first part 13p1 is not equal to the second slant angle θ2 of the second part 13p2.

In addition, FIG. 6 shows that the photodiode array 13 further includes first dummy photodiodes 13d1 and second dummy photodiodes 13d2 used to reduce effect of stray light to the photodiode array 13. Similarly, both the first dummy photodiodes 13d1 and the second dummy photodiodes 13d2 have a first part and a second part respectively tilted toward the first direction.

In an alternatively aspect, the code slits 21 and the photodiode array 13 are respectively tilted by different slant angles to achieve the objective of reducing the total harmonic distortion as long as said different slant angles have an angle difference therebetween.

Compared with 3.63% total harmonic distortion obtained by using non-tilted code slits, the present disclosure can reduce the total harmonic distortion to 0.122% by using tilted code slits.

It should be mentioned that although the above embodiments are described in the way that coverages of the first photodiode, the second photodiode, the third photodiode and the fourth photodiode of two sets of position photodiodes at two ends of the photodiode array are sequentially decreased or increased with a step change, the present disclosure is not limited thereto. In other embodiments, coverages of the two sets of position photodiodes at two ends of the photodiode array are sequentially decreased or increased with a smooth change without a step change from one photodiode to another photodiode.

It should be mentioned that although the above embodiments are illustrated by using one or two slant angles, the present disclosure is not limited thereto. In other aspects, the code slits and/or photodiodes include more than two slant angles, e.g., including two or three inflection points to form a zig-zag shape.

It should be mentioned that although the above embodiments are illustrated by a photodiode array with two sets of photodiodes arranged at two ends being partially covered, the present disclosure is not limited thereto. In other aspects, all photodiodes of the photodiode array are not covered, and the objective of reducing the total harmonic distortion is achieved by tilting the code slits and/or photodiodes.

It should be mentioned that in an aspect including index slits and index photodiodes, the index slits have the same slant angle as the code slits mentioned above.

It should be mentioned that values in the above embodiments, including slant angles, sizes, numbers and coverages, are only intended to illustrate but not to limit the present disclosure.

As mentioned above, when code slits pass over photodiodes, apparent total harmonic distortion is induced in output photocurrents. Accordingly, the present disclosure provides an optical encoding system with tilted code slits (e.g., FIGS. 2, 4 and 5) and/or tilted photodiodes (e.g., FIG. 6) to alleviate the total harmonic distortion in photocurrents.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical encoding system, comprising:
 a code disk, arranged with equally-spaced multiple code slits along a tangential direction, and a length direction of the multiple code slits having a slant angle with respect to a radial direction of the code disk; and
 a photodiode array opposite to the multiple code slits, the photodiode array comprising multiple sets of photodiodes each set having a first photodiode, a second photodiode, a third photodiode and a fourth photodiode sequentially arranged along the tangential direction, wherein
 output currents of the first photodiode and the second photodiode are phase quadrature,
 output currents of the first photodiode and the third photodiode are out of phase, and
 output currents of the second photodiode and the fourth photodiode are out of phase.

2. The optical encoding system as claimed in claim 1, wherein the multiple code slits are slanted toward a clockwise direction or a counter clockwise direction of the code disk.

3. The optical encoding system as claimed in claim 1, wherein
 coverages of the first photodiode, the second photodiode, the third photodiode and the fourth photodiode of a first set of photodiodes among the multiple sets of photodiodes by an opaque layer are respectively 90%, 70%, 50% and 30%; and
 coverages of the first photodiode, the second photodiode, the third photodiode and the fourth photodiode of a last set of photodiodes among the multiple sets of photodiodes by the opaque layer are respectively 30%, 50%, 70% and 90%.

4. The optical encoding system as claimed in claim 1, wherein the slant angle is determined according to a number of the multiple code slits and a size of each photodiode of the photodiode array.

5. The optical encoding system as claimed in claim 1, wherein a length direction of each photodiode of the photodiode array is arranged along the radial direction.

6. An optical encoding system, comprising:
 a code disk, arranged with equally-spaced multiple code slits along a tangential direction, and the multiple code slits having a first length direction and a second length direction, wherein the first length direction has a first slant angle with respect to a radial direction of the code disk, and the second length direction has a second slant angle with respect to the radial direction of the code disk; and
 a photodiode array opposite to the multiple code slits, the photodiode array comprising multiple sets of photodiodes each set having a first photodiode, a second photodiode, a third photodiode and a fourth photodiode sequentially arranged along the tangential direction, wherein
 output currents of the first photodiode and the second photodiode are phase quadrature,
 output currents of the first photodiode and the third photodiode are out of phase, and
 output currents of the second photodiode and the fourth photodiode are out of phase.

7. The optical encoding system as claimed in claim 6, wherein
 a first length of the multiple code slits in the first length direction is equal to a second length of the multiple code slits in the second length direction, and
 the first slant angle is equal to the second slant angle.

8. The optical encoding system as claimed in claim 6, wherein
 a first length of the multiple code slits in the first length direction is not equal to a second length of the multiple code slits in the second length direction, and
 the first slant angle is not equal to the second slant angle.

9. The optical encoding system as claimed in claim 6, wherein the first length direction and the second length direction are both toward a clockwise direction or a counter clockwise direction of the code disk.

10. The optical encoding system as claimed in claim 6, wherein a connection point of a first length of the first length direction and a second length of the second length direction is at a center point of the multiple code slits.

11. The optical encoding system as claimed in claim 6, wherein
 coverages of the first photodiode, the second photodiode, the third photodiode and the fourth photodiode of a first set of photodiodes among the multiple sets of photodiodes by an opaque layer are respectively 90%, 70%, 50% and 30%; and
 coverages of the first photodiode, the second photodiode, the third photodiode and the fourth photodiode of a last set of photodiodes among the multiple sets of photodiodes by the opaque layer are respectively 30%, 50%, 70% and 90%.

12. The optical encoding system as claimed in claim 6, wherein all photodiodes of the photodiode array are not covered by an opaque layer.

13. The optical encoding system as claimed in claim 6, wherein the first slant angle and the second slant angle are determined according to a number of the multiple code slits and a size of each photodiode of the photodiode array.

14. The optical encoding system as claimed in claim 6, wherein a length direction of each photodiode of the photodiode array is arranged along the radial direction.

15. The optical encoding system as claimed in claim 6, wherein a center point of a length of each photodiode of the photodiode array is aligned with a connection point of a first length of the first length direction and a second length of the second length direction of the multiple code slits.

16. An optical encoding system, comprising:
 a photodiode array, comprising multiple sets of photodiodes each set having a first photodiode, a second photodiode, a third photodiode and a fourth photodiode arranged along a first direction,
 wherein a first part and a second part of the first photodiode, the second photodiode, the third photodiode and the fourth photodiode are slanted toward the first direction, and
 the first part and the second part are directly jointed at a connection point which forms an inflection point of the first photodiode, the second photodiode, the third photodiode and the fourth photodiode.

17. The optical encoding system as claimed in claim 16, wherein a length of the first part is equal to a length of the second part, and a first slant angle of the first part slanted toward to the first direction is equal to a second slant angle of the second part slanted toward to the first direction.

18. The optical encoding system as claimed in claim 16, further comprising:

a code disk, arranged with equally-spaced multiple code slits along a tangential direction and opposite to the photodiode array, wherein a length direction of the multiple code slits is arranged along a second direction perpendicular to the first direction.

19. The optical encoding system as claimed in claim 16, wherein output currents of the first photodiode and the second photodiode are phase quadrature, output currents of the first photodiode and the third photodiode are out of phase, and output currents of the second photodiode and the fourth photodiode are out of phase.

\* \* \* \* \*